US005472995A

United States Patent [19]
Kaminski et al.

[11] Patent Number: 5,472,995
[45] Date of Patent: Dec. 5, 1995

[54] ASBESTOS-FREE GASKETS AND THE LIKE CONTAINING BLENDS OF ORGANIC FIBROUS AND PARTICULATE COMPONENTS

[75] Inventors: Stanley S. Kaminski, Stamford; Robert E. Evans, Huntington, both of Conn.

[73] Assignee: Cytec Technology Corp., Wilmington, Del.

[21] Appl. No.: 288,363

[22] Filed: Aug. 9, 1994

[51] Int. Cl.$^6$ .................................................. C08J 5/14
[52] U.S. Cl. .................... 523/155; 523/156; 428/224; 428/281; 428/283; 428/288; 524/425; 524/426; 524/445; 524/448; 524/447; 524/451; 525/234
[58] Field of Search .................. 525/234; 428/224, 428/281, 283, 288; 524/425, 426, 445, 448, 449, 451; 523/155, 156

[56] References Cited

U.S. PATENT DOCUMENTS

| | | | |
|---|---|---|---|
| 2,691,645 | 10/1954 | Ham | 210/79.5 |
| 2,963,457 | 12/1960 | Miller | 260/29.6 |
| 2,983,718 | 5/1961 | Wishman et al. | 260/80.5 |
| 4,330,442 | 5/1982 | Lindeman et al. | 524/16 |
| 4,387,178 | 6/1983 | Tracy et al. | 524/448 |
| 4,423,109 | 12/1983 | Greenman et al. | 428/288 |
| 4,748,075 | 5/1988 | Beyer et al. | 428/221 |
| 4,811,908 | 3/1989 | Galati | 241/21 |
| 4,820,585 | 4/1989 | Tedesco et al. | 428/360 |
| 4,837,281 | 6/1989 | Hibbard et al. | 525/234 |
| 4,866,109 | 9/1989 | Hibbard et al. | 524/5 |
| 5,041,471 | 8/1991 | Brinzey | 523/153 |
| 5,106,887 | 4/1992 | Horiguchi | 523/155 |
| 5,272,198 | 12/1993 | Kaminski et al. | 524/426 |
| 5,362,562 | 11/1994 | Evans et al. | 428/369 |

FOREIGN PATENT DOCUMENTS

| | | |
|---|---|---|
| 0511838 | 11/1980 | European Pat. Off. . |
| 03045685 | 12/1991 | Japan . |
| 866445 | 1/1959 | United Kingdom . |
| 1179569 | 4/1989 | United Kingdom . |
| 93/04300 | 3/1993 | WIPO . |

*Primary Examiner*—Edward Cain
*Attorney, Agent, or Firm*—Frank M. Van Riet

[57] ABSTRACT

Improved asbestos-free fiber reinforced material for use in the manufacture of gaskets, and the like, comprises (a) an elastomeric binder material and (b) a blend of fibrillated, organic, synthetic polymer, organic synthetic polymer staple and organic synthetic, soluble polymer particles so as to enhance the strength of the gaskets, shock mountings, timing belts, sealants, and the like, made from such materials.

21 Claims, No Drawings

ASBESTOS-FREE GASKETS AND THE LIKE CONTAINING BLENDS OF ORGANIC FIBROUS AND PARTICULATE COMPONENTS

This invention relates to the use of blends of a) a fibrillated, organic, synthetic polymer, b) synthetic, organic polymer fiber staple and c) synthetic, organic, soluble polymer particles as processing aids/reinforcements for asbestos-free materials to make gaskets, and the like. More particularly, it relates to the manufacture of a material containing the above blend useful in the manufacture of gaskets, pneumatic tires, shock mountings, timing belts, sealants, other molded rubber and elastomeric articles, and the like. The present invention is also directed to such materials which are processed in wet state either from aqueous, solvent liquid resin, based formulations or emulsions and the above-described blends. Accordingly, the general objects of the present invention are to provide an improved asbestos-free material and articles of manufacture made therefrom.

BACKGROUND OF INVENTION

Asbestos fiber-containing articles such as gaskets, brake linings, pneumatic tires, conveyor belts, timing belts, power transmission couplings, shock absorbers, sealants, paints, and the like, are well-known and have achieved significant commercial success. Unfortunately, recent medical evidence indicates that asbestos fibers can cause health hazards, particularly when inhaled. These health hazard problems of asbestos fibers are well-known also, and accordingly, the industry has been searching for replacement compositions for forming gaskets, and the like, which do not contain asbestos fibers, but yet achieve substantially the same physical and chemical properties.

Fibers have been added to organic thermosetting plastic matrices to improve one or more properties of the matrices. For example, DeMaria and Relmond in U.S. Pat. No. 4,352,852, show that from about 10 to about 90 weight percent of an acrylonitrile polymer fiber having a straight tenacity of at least about 5.0 grams per denier, reinforces thermosetting resins, such as polyesters and peroxide curatives, much better than the widely used glass fibers. The required tenacity is obtained by post stretching a conventional wet spun acrylonitrile polymer fiber in steam under pressure to obtain a higher than normal tenacity. The fibers used have a diameter of about 20 microns, i.e., greater than about 12 microns.

Greenman, et al, in U.S. Pat. No. 4,423,109, describe fiber reinforced rubber gasket materials, in which one of the fiber materials can comprise glass fibers, and another can comprise polyacrylics, e.g., polyacrylonitrile fibers. No preference is stated or disclosed as between glass, on the one hand, or polyacrylics, on the other, and nothing is suggested that would teach using fibrillated fibers in combination with fiber staple and soluble polymer particles.

Many other proposals have been put forth to replace asbestos fibers in a variety of end uses. Mention can be made, for example of U.K. Patent No. 1,179,569 (tires); EPO Patent Publication No. 0 511 838 (marine couplings and timing belts); Research Disclosure No. RD 276096A (Apr. 10, 1987) and U.S. Pat. No. 4,820,585 (sealants and coatings); and U.S. Pat. Nos. 4,330,442, 4,387,178, 4,423,109, and 4,866,109 and Japanese Patent Publication No. J03045685 (Feb. 27, 1991) (gaskets).

Equally important are fiber replacements for asbestos fibers in gasket-forming compositions, because, in order to meet government regulations regarding the emissions of certain gases, such as hydrocarbons and halogens, gaskets in mechanically jointed flanges must be able to maintain their seal and prevent leakage of fluids and gases even when subjected to an extremely severe operating environment and undesirable mechanical conditions. Thus, these gaskets must be able to function even though the flanges are either poorly designed or poorly machined and must maintain the ability to seal the flange and prevent leakages even under high operating temperatures and high internal pressures. Gaskets produced from many prior art materials proposed to replace asbestos fibers, generally either leak or blow out when exposed to the aforementioned conditions and environments. A significant practical drawback in the prior art gasketing materials is less than optimum flexibility and lower than optimum elongation. This is especially noted with glass or cellulose fibers or polyaramide fibers as the reinforcement, primarily because of their lack of ability to provide adequate elongation and flexibility to the gasket. Flexibility is important from a practical standpoint because a gasket must be able to survive handling, cutting and packaging procedures prior to installation, without cracking or loss of design geometry. Acrylic fibers provide many advantages in such uses over the others mentioned because they are uniquely adapted to elastomeric matrix resin wet-out, even without the use of sizing agents on their surface to "couple" to the resin and thereby enhance wetting and reinforcement.

Typical of state-of-the art compositions and methods are those disclosed in Hibbard, et al, U.S. Pat. Nos. 4,837,281, and 4,866,109, which describe making reinforced gasketing materials by cutting acrylic fibers and using them to reinforce rubbers which are converted to cured sheets for use as gaskets. These citations do not disclose the use of fiber/particle blends, however.

Lindeman et al, U.S. Pat. No. 4,330,442, describe asbestos-free gasket forming materials by a beater-additive process in which the fibers comprise phenolic fibers mixed with aromatic polyamide fibers.

Tracey et al, U.S. Pat. No. 4,387,178, describe compressible soft asbestos-free gasket materials by a beater-additive process in which the fibers comprise fibrillated aromatic polyamide fibers. Such fibers do not provide end products with the optimum elongation.

Nakahara et al, EPO Patent Publication No. 511,838-A1, is also of interest in this connection because it deals with fibrillated polyacrylonitrile short (but not less than 10 microns in length) fibers dispersed in a rubber, to provide high strength and high modulus and good rubber fiber interaction. The compositions are vulcanizable with organic peroxides and also with sulfur to produce timing belts, marine materials, chains, rubber springs, and the like, all uses formerly employing asbestos.

WO 93/04300 utilizes aramid particles as wear additives in conjunction with fibers in the form of floc or pulp. The pulp is fibrillated fibers. The particles are 10–250 microons in size. The patent is silent with respect to the use of both fibrillated fiber and a fiber staple with the polymer particles.

Recently issued U.S. Pat. No. 5,272,198 teaches the use of microdenier fibers of up to about 12 microns in the production of gaskets etc. Again, no organic, synthetic polymer particles are incorporated.

U.S. Pat. No. 4,748,075 teaches a soft gasketing material composed of at least three (3) different fibers i.e. natural fibers, synthetic organic fibers and mineral or metal fibers. No organic, synthetic polymer particles are employed.

In general, with particular reference to acrylic fibers, e.g., fibers of a co-polymer containing acrylonitrile in a quantity more than 85 wt-%, have good extensibility, which prevents their fragmentation during mixing, and they adhere well to most resin systems because of the polar nitrile groups present in the molecule. These attributes make them desirable materials in the replacement of asbestos, in uses where flexibility enhancement and extensibility in resin systems is needed while maintaining or increasing the strength of the resulting resin-fiber composite. Modacrylic fibers with more than 35 wt % and generally less than 85 wt % acrylonitrile in the co-polymer provide also good extensibility, resistance to fragmentation during mixing and good adhesion to most resin systems, while also providing other attractive attributes such as fire retardancy. Consequently, they also are desirable materials for replacing asbestos.

In summary, the citations above show that, in the present state of the art, fibrous organic reinforcements are known to be suitable replacements for inorganic reinforcing fibers, like glass, in materials for making gaskets, belts, tires, Sealants, and the like, and the fibers may specifically comprise acrylic fibers.

It has now been discovered, and is the subject of this invention, that selecting and using blends of a) a fibrillated, organic synthetic polymer fiber, b) a synthetic, organic polymer fiber staple and c) synthetic, organic, soluble polymer particles results in an unexpected increase in the processing and/or milling of elastomeric resin binder systems for materials to produce gaskets, shock absorbers, rubber springs, pneumatic tires, sealants, and the like. Such results are nowhere foreshadowed by the prior art and demonstrate manifest advantages in using blends in accordance with the present invention as for materials to make gaskets and the like. The effectiveness of the blends when at least one component is produed from an acrylic polymer is also a feature of the present invention.

It is a principal object of the present invention to provide materials for gaskets and the like, reinforced with the above-described blends to enhance the processability and mixing and to increase the strength of articles manufactured from such materials. Extensibility (elongation) of elastomeric materials may also be increased. Because of the good UV resistance and low moisture absorption of the acrylic fibers, and particulates, they are well suited for outdoor applications. Also, because of their good hydrocarbon and other chemical resistance they are well suited as automotive parts, brakes, tires, fuel tank and chemical tank sealant components, as well as in gaskets.

SUMMARY OF THE INVENTION

According to the present invention, there are provided asbestos-free fiber reinforced materials comprising:
 (a) an elastomeric matrix composition; and
 (b) an effective reinforcing amount of a blend of:
 1) from about 5 to about 75 weight percent of a fibrillated, synthetic, organic polymer fiber;
 2) from about 20 to about 90 weight percent of a synthetic, organic polymer staple fiber and
 3) from about 5 to about 30 weight percent of synthetic, non-thermosetting, organic polymer particles.

In another aspect, the present invention contemplates reinforced gaskets produced from asbestos-free gasket material as above defined wherein the reinforcement (b) comprises at least one component in the form of an acrylic polymer containing acrylonitrile.

In still another principal aspect of the present invention, there are provided compositions adapted for use in asbestos-free gaskets, the compositions comprising:
 (a) an curable elastomeric resin and a curative therefore, alone, or in further combination with:
 (i) a pigment,
 (ii) a dye,
 (iii) a heat stabilizer,
 (iv) an antioxidant,
 (v) a plasticizer,
 (vi) a lubricant,
 (vii) a I/V-stabilizer,
 (viii) a flame-retardant agent,
 (ix) a processing aid,
 (x) a foaming agent,
 (xi) a filler,
 (xii) non-acrylic organic fibers and pulps,
 (xiii) inorganic fibers selected from glass, ceramic, mineral fibers, and the like, or
 (xiv) a mixture of any of the foregoing, and
 (b) an effective concentration of a reinforcement for said composition, said reinforcement comprising:
 1) a synthetic, organic polymer fibrillated fiber,
 2) a synthetic, organic polymer staple fiber and
 3) synthetic, soluble organic polymer particles.

Especially useful embodiments of the invention are beater additive gaskets made from asbestos-free gasket forming compositions comprising in weight parts per 100 parts of the total fiber and filler weight about 5 to 25 parts of the above-described blends, alone, or in combination with; about 40 to 70 parts of at least one inorganic filler; and 10 to 40 parts added-on of a synthetic rubber binder.

DETAILED DESCRIPTION OF THE INVENTION

The term "acrylic fibers", as used herein includes fibers obtained by the wet-spinning, dry-spinning, flash-spinning, air gap-spinning, etc., of homopolymers of acrylonitrile, of copolymers containing at least 85% by weight of acrylonitrile, the residue being an ethylenically unsaturated comonomer copolymerizable with acrylonitrile, or blends of polymers wherein the total content of polymerized acrylonitrile is higher than 70 % by weight. The term also includes "modacrylic fibers" which are copolymers comprising from 35 to 85 % by weight of polymerized acrylonitrile.

The improved fiber reinforced materials of the present invention are formed by intimately mixing the above-described blends with a natural or synthetic rubber, either neat, or in the form of a solution, latex or dispersion in water or an organic solvent, such as toluene. The rubber can also contain varying amounts of inorganic particulate fillers, such as mica, silica, calcium carbonate, carbon black, clay, and the like, and will typically also include compounding agents such as accelerators, curatives, and antioxidants, in order to achieve the desired saturate rheology and final product characteristics. Other organic and/or organic fibers may be present. The composition can be converted to sheets, e.g., by conventional beater addition technology, or by hot/cold roll milling, etc., and cured by conventional methods, such as between the platens of a heated press.

Another type of gasket product is called a "formed-in-place" gasket. An elastomeric binder, usually solvent based, and fillers/fibers/etc., comprise such products. For application, the compositions are deposited as sealants directly on the surfaces to be mated. The compositions require a period of time for the escape of some solvent before mating the "gasketed" surfaces.

In an especially convenient manner of proceeding, there is provided a beater saturated, water-laid, asbestos-free, rubberized gasket forming composition, typically in the form of a flat sheet, which exhibits excellent tensile strength, heat resistance and creep resistance and which comprises, the fiber/particle blends of the present invention at least one inorganic or cork filler, and a suitable binder. The flat sheet can be made by any of the well-known processes for forming such sheets from fibers, fillers and binders, so long as the requisite amounts of these ingredients are employed as hereinafter described. To produce the sheet in accordance with this convenient procedure of the present invention an aqueous slurry comprising the fiber/particle blend and at least one inorganic filler is mixed with from about 2 to about 40 parts by weight add-on per 100 parts by weight of the total blend and filler weight of a soluble salt selected from the group consisting of aluminum salts, ferric salts, and stannic salts followed by the addition of sufficient amount of an alkaline hydroxide to provide a furnish pH within the range of from about 6 to about 10 and preferably from about 7 to about 8. The alkaline hydroxide converts the soluble salts to a water insoluble hydroxide. A synthetic rubber latex is then added to the mixture until the latex precipitates onto the fibers, particles and fillers. Water is then removed from the resulting furnish composition to form the flat sheet.

The aqueous furnish composition can also include a latex antioxidant, ceramic or glass fibers, mineral wool, retention aids, biocides, latex curing agents, latex dispersing agents and the like.

The aqueous furnish composition will contain from about 3 to about 60 parts, and preferably from about 5 to 25 parts, by weight of the fiber/particle blend per 100 parts of the total fiber and filler weights.

The aqueous furnish composition will contain at least one inorganic filler present in an amount within the range of from about 10 to 80 parts, and preferably 40 to 70 parts by weight total inorganic filler per 100 weight parts of the total fiber, particle and filler composition. The inorganic filler will be selected from the group consisting of paper filler clay, wollastonite, talc, calcium carbonate, mica, and diatomaceous earth, mixtures of the foregoing, and the like. Particularly suitable fillers include wollastonite of P-4, P-1 or C-1 grade, all commercially available from Interpace Company, kaolin paper filler clays designated "Hi-Opaque clay," commercially available from Freeport Kaolin Clay Company, "Narvon" paper filler clay, commercially available from Combustion Engineering Inc., and "Klondyke" paper filler clay or "Klondyke KWW" paper filler clay, both commercially available from Engelhart Minerals and Chemicals Corporation. Special mention is made of talc, particularly Platey Talc, commercially available from Pfizer Incorporated under the trade designation "M-12-50." The fillers employed must be chemically inert so that they do not interfere with the precipitation of the rubber latex during formation of the felt sheet.

The aqueous furnish composition will contain from about 10 to about 40 parts by weight add-on of a suitable binder per every 100 parts of the total fiber, particle and filler weight. Any suitable binder can be employed which is used in the prior art to bind fibers, particles and fillers including synthetic rubber and resins. In a preferred embodiment of the present invention the fibers, particles and fillers are bound together by a synthetic rubber which is deposited on the fibers, particles and fillers by precipitation from a latex of the synthetic rubber. Any suitable synthetic anionic-type rubber latex can be employed-including nitrile rubber, styrene butadiene latexes, carboxylated styrene butadiene latexes, carboxylated acrylonitrile butadiene, polychloroprenes, and the like. These latexes can be used singularly or in combination. Particularly suitable rubber latexes include Reichhold Corporations's 4700 A nitrile latex, which has 40% total solid content and a pH of 9 and BF Goodrich's 1572X45 Hycar nitrile latex, which has a 47% total solid content, a pH of 6.5, a specific gravity of 0.99 and a Brookfield viscosity of 85 cps. Special mention is made of Goodyear Corporation's Chemigum 260, a nitrile latex having a total solids content of 35%.

The aqueous furnish composition will preferably contain about 0.2 to about 2 parts by weight of a latex antioxidant per 100 parts of the total fiber, particle and filler weight. A particularly suitable latex antioxidant is designated "Flectol H," commercially available from Monsanto Industrial Chemicals Company. Flectol H is polymerized 2,2,4-trimethyl-1,2-dihydro quinoline. Other suitable antioxidants include B. F. Goodrich Chemical Company's "Agerite White" antioxidant, which is sym Dibeta-naphthyl-paraphenylenediamine.

As stated above, ceramic fibers may optionally be added to the aqueous furnish composition of the present invention. Suitable ceramic fibers include Babcock and Wilcox's chopped ceramic fiber available under the trade designation "Kaowool," which is an aluminasilica ceramic fiber.

As stated above, standard latex curing agents may be employed in conjunction with the rubber latex binders utilized herein. One such standard latex cure package consists of 42 wt % sulfur, 38 wt % zinc 2-mercaptobenzothiazole, and 20 wt % zinc dimethyidithiocarbamate. Other standard latex curing agents or cure packages are well-known in the art, will be described in the working examples which follow, and may be similarly employed herein.

It will be understood that the amounts of the ingredients used to produce the compositions for forming gaskets and the like of the present invention can be varied within the ranges specified, but that they are interdependent and must be varied so that a gasket forming composition as described herein can be produced. For example, those skilled in the art will appreciate that if the lower limits of the ranges for the fiber/particle blend components and the optional other fibers are employed, and the upper limit of the inorganic filler is used, the lower limit of binder may not be sufficient to bind the large amount of filler.

In another convenient manner of proceeding, the procedure outlined in U.S. Pat. No. 4,423,109 may be used to manufacture a reinforced high density sheet material to be used as a gasket. In this procedure, the fiber/particle blend is saturated with an aqueous dispersion of chloroprene rubber latex and a filler to produce a composition with, e.g., a 34 wt % rubber content. The aqueous dispersion can for example comprise the following solids (parts by weight): chloroprene rubber, 50 parts, mica (C3000), 50 parts, zinc oxide, 7.5 parts, sulfur, 2 parts, nickel butyl carbonate, 5 parts, antioxidant, 2 parts, and phenolic resin, 10 parts.

The gasket mix then is dried in a circulating oven at 230 degrees F. and the rubber is then dried by pressing the sheet between hot platens, at 2000 pounds per square inch and at 320 degrees F. for two minutes.

Properties of the sheets are determined by standard tests methods as follows:

C D Tensile, psi; per ASTM F 152

Sealability, ml/hr; per ASTM F 37, Fuel A 250 psi, 30" Hg
A Creep, %; per ASTM F38B, 22 Hrs, 105° C., 3000 psi
B Creep, %; per ASTM F38B, 20 Hrs, 150° C., 2500 psi
Compressibility @5000 psi; per ASTM F36, Type 1 material
Elmendorf tear, gms; per ASTM D689

In the manufacture of fiber reinforced high density gasketing material using such a two roll sheeting machine, different compositions for a starter layer, a body layer, and a finish layer are utilized to produce a gasket. That is, separate layers are built upon the hot roll in order to obtain the desired reinforced material.

A starter mix, which forms a starter layer, is used to get material to adhere to the surface of the hot roll. The body mix, inserted into the nip of the rollers next, forms the body layer atop the starter layer. The body layer comprises the majority of the material in the finished product, and contains the greatest amount of reinforcing agent. The finish layer provides a smooth surface atop the body layer. The finish layer is thin and is generally used for cosmetic purposes. The composition of the starter layer mix and the finish layer mix may be the same.

The fibrillated fibers which form the first component of the blends used in the instant invention are well known to those skilled in the art and any fibrillated fiber known to be useful in gasketing materials is useful herein. Specifically, and most preferably, fibrillated acrylic polymer fibers may be employed. These fibrillated fibers preferably have a Canadian Standard Freeness (CSF) of below about 600 ml and have been preferably formed from a polymer whose melting point is above about 450° F. They should have a length ranging from about 2 mm to about 10 mm and a diameter of from about 8 microns to about 50 microns.

Preferred fibers are fibers having an acrylonitrile content of at least 85% (based on weight of acrylonitrile monomer content to total monomer content of the prepolymerization mixture). Particularly useful fibers are those of polymers having an acrylonitrile content in excess of about 89%. The preferred comonomers comprise methyl methacrylate or vinyl acetate which are preferably present at levels of approximately 8.5%, by weight, as discussed above.

An even more preferred fibrillated fiber is that produced from a random bicomponent fiber made from a 50/50 mixture of a 90/10 acrylonitrile/methyl methacrylate or vinyl acetate copolymer and a 93/7 acrylonitrile/methyl methacrylate or vinyl acetate copolymer. Other comonomers may be used without limitation provided that their inclusion does not materially detract from the ability of the fiber to be fibrillated nor with the properties of the fibrillated fiber produced. Compatibility of such other monomers can easily be determined by one skilled in the art by simple experimentation. Alternatively, the acrylic fiber can be homopolymer.

Canadian Standard Freeness is measured as is described in a test set forth in an article entitled "Freeness of Pulp"; Tentative Standard 1943; Official Standard 1946; Revised 1958 and Official Test method 1985; Prepared by The Technical Committee of the Tappi Association.

The fibrillated acrylonitrile fibers useful in the instant invention can be made in any known manner such as by using a modified commercial blender. In general, modified Waring® brand commercial blenders wherein the as-supplied blade has been modified to provide a break edge of about 0.25 mm on the working edge, may be used. In operation, a relatively dilute slurry of precursor fiber in water is generally introduced into the blender device which is then run for from at least about one-half hour to at least about one hour depending upon the molecular weight and diameter of the fiber being used. The fibrillated fibers are well known to those skilled in the art and can be prepared as is known to them such as described in the patents mentioned above, e.g. U.S. Pat. No. 4,866,107. Additionally, U.S. Pat. No. 4,811,908 teaches such a method, said patents hereby being incorporated herein by reference.

Fibrillated high modulus/high molecular weight acrylic fiber may also be used. By "high molecular weight" is meant a weight average molecular weight of at least about 150,000. The fibrillated fibers useful herein may also contain additives such as cyanoguanidine (DICY), metal salts, N-substituted malimides, etc. to enhance thermal stability.

The fibrillated fibers may also be formed from other polymers and still be useful in the present invention. Thus, aliphatic polyamides, polyesters, polyvinyl alcohols, polyolefins, polyvinyl chlorides, polyvinylidene chlorides, polyurethanes, polyfluorocarbons, phenolics, polybenzimidazoles, polyphenylenetriazoles, polyphenylene sulfides, polyoxadiazoles, polyimides, aromatic polyamides etc. may be used. The aromatic polyamides (aramids) are preferred after the acrylic polymers discussed above, followed by the cellulose acetates, the polybenzoxadiazoles, polybenzimidazole, etc. Aramid polymers such as poly (p-phenylene terphthalamide) and poly (m-phenylene isophthalamide) are exemplary.

Aramids, as used herein, are intended to include wholly aromatic polycarbonamide polymers and copolymers of recurring units of the formula

$$-HN-AR_1-NH-CO-AR_2-CO-$$

wherein $AR_1$ and $AR_2$, which may be the same or different, represent divalent aromatic groups. Para-aramids refer to para-oriented aromatic polycarbonamides of Formula I, above, wherein $AR_1$ and $AR_2$, which may be the same or different, represent divalent, para-oriented, aromatic groups. By "para-oriented" is meant that the chain extending bonds from aromatic groups are either coaxial or parallel and oppositely directed, for example, substituted or unsubstituted aromatic groups including 1,4-phenylene, 4,4'-biphenylene, 2,6-naphthalene, and 1,5-naphthalene. Substituents on the aromatic groups other than those which are part of the chain extending moieties should be nonreactive and must not adversely affect the characteristics of the polymer for use in the practice of this invention. Examples of suitable substituents are chloro, lower alkyl and methoxy groups. The term para-aramid also encompasses para-aramid copolymers of two or more para-oriented comonomers including minor amounts of comonomers where the acid and amine functions coexist on the same aromatic species, for example, copolymers produced from reactants such as 4-aminobenzoyl chloride hydrochloride, 6-amino-2-naphthoyl chloride hydrochloride, and the like. In addition, para-aramid encompasses copolymers containing minor amounts of comonomers containing aromatic groups which are not para-oriented, such as, for examples, m-phenylene and 3,4'-biphenylene. Those taught in WO 93/04300, incorporated herein by reference are exemplary.

The fibrillated fiber components of the blends of the present invention may be crimped or non-crimped.

Preferably the fibrillated acrylic fiber should have a BET surface area of over $5M^2/g$, a CSF from 50 to 600, a modulus of 2.75 GPa to 16.5 GPa, a number average molecular weight of 75,000 to 500,000 and a specific gravity of 1.1 to 1.2.

The second critical component of the blends used in the instant invention is a synthetic, organic polymer, staple fiber.

Any of the polymers discussed above with respect to the fibrillated fiber component can be utilized to produce the staple fiber component. The preferred staple fiber is one made from an acrylic polymer i.e. acrylonitrile polymer, as discussed above. The staple fiber may also be crimped or non-crimped. It preferably has a length of from about 0.5 mm to about 12 mm, more preferably from about 1.5 mm to about 7 mm. It preferably has a diameter of from about 8 microns to about 50 microns, more preferably about 10 to about 25 microns, a modulus of 2.75 GPa to 85 GPa and a specific gravity of 0.90 to 2.00.

Preferably, the staple fiber is an acrylic staple with a minium modulus of 2.75 GPa and a minimum weight average molecular weight of 75,000 and a specific gravity of 1.15 to 1.2. The acrylic staple fibers may be either prepared from copolymers or homopolymers as discussed above.

Preferably, the staple fiber for higher temperature and/or structural performance is an acrylic staple fiber having 1) additives to increase thermal stability or 2) high modulus/ high molecular weight with a minimum modulus of 5.5 GPa and a minimum weight average molecular weight of 150,000, or 3) been preoxidized to a greater than 30% reduction in its nitrile group content to result in a minimum modulus of 5.5 GPa because of thermal treatment or 4) any combination of 1)–3). These preferred acrylic staple fibers provide improved frictional/thermal stability and/or strength to the gasketing material produced therefrom.

The fiber staple may have a circular or non-circular cross-section, i.e. may be ribbon fiber, or may be dog bone shaped, S-shaped, C-shaped etc. The staple fiber may be milled, may be in the form of floc, may contain thermal stability enhancing additives, may be slightly to fully preoxidized, maybe carbon fiber, or the like.

The third component of the blends used in the present invention is a particulate, synthetic, soluble organic polymer. The particulate component may also be produced from any of the above-discussed polymers from which the fibrillated fiber component is prepared as long as it is soluble. By the term "soluble", as used herein, is meant that the polymer from which the particles are made is soluble in some meduim i.e. organic solvent, water, acid etc. and the particle maintains its physrical identity after being cured into the ultimate gasket. The particulate may be formed by reaction or by grinding and/or pulverizing larger pieces of polymer.

Again, preferably, the particulate component is produced from an acrylic polymer. The particulate component may be solid or porous and may have an average diameter below about 60 microns. More preferably, the particulate component is formed during the polymerization of acrylonitrile by a bulk, emulsion, aqueous-suspension or slurry process which causes a polymer particulate to be precipitated or suspended from drops of monomer or dissolved monomers as discussed in U.S. Pat. No. 2,983,718, German Patent 1,093,990, Brit. Patent 866,445, U.S. Pat. No. 2,691,645 and U.S. Pat. No. 2,963,457. The particulate components preferably have a BET surface area of at least about 1 $m^2/g$ and a specific gravity of from about 1.10 to about 1.20. For higher temperature stability, preferably the particulate acrylic component is preoxidized to a greater than 30% reduction in nitrile group content and to increase its specific gravity to about 1.25 to 1.38.

The blend useful in preparing the gasketing material the present invention comprises from about 5 to about 75 weight percent of the fibrillated fiber, preferably from about 15 to about 50 weight percent; from about 20 to about 90 weight percent of the staple fiber, preferably from about 40 to about 80 weight percent and from about 5 to about 30 weight percent of the particulate soluble polymer, preferably from about 5 to about 15 weight percent, the total weight percent of all three components, of course, being 100%.

Preferably at least one of the three components of the blend is an acrylic polymer. More preferably, two components are acrylic polymers and most preferably, every component is an acrylic polymer.

When at least either the staple fiber or the particulate component is an acrylic polymer, the particulate component can be carbonized, but it is preferred that the particulate polymer be non-carbonized.

The individual blend components useful in the instant invention may be effectively introduced into the gasketing material separately, however, it is preferred that all the components be preblended prior to introduction into the mixer or preblended in the mixer prior to the introduction of other components. During mixing, the fibrillated fibers, via their tentacle-like projections, catch the staple fibers and particulate polymer so as to evenly distribute them. The components can be premixed, either in a wet or dry state, using techniques known to those skilled in the art. For example, each component can be mixed as a wet slurry in a hydropulper, a heater, a disc refiner or other type of equipment known to those skilled in the art and then dewatered on a paper machine or belt press to about 30–60% solids. Suitable cationic and/or anionic retention aids may be used to retain particulate polymer and fiber staple in the fibrillated fiber. Additionally, the particulate polymer and/or staple fiber can be blended with the wet fibrillated fiber, which is at a 30–60% solids content, during drying and fluffing in equipment such as a Rennelburg rotary dryer. All or some components may also be blended in a dry or partially dry state using a Littleford mixer, a Wrassmann processor, rotary dryer, Fitzmills, or other similar mixing equipment known to those skilled in the art.

The following description is intended as a generalized discussion of another means to produce high density material suitable for gaskets and the like, which incorporates the blend of fibrillated fiber, staple fiber and particulate polymer in its formulation. Parts are by weight.

A starter layer mix composition may be prepared by mixing 10 parts of natural rubber and 56 parts of toluene for 30 minutes. Thereafter, to this mixture is added 0.5 parts of zinc oxide as activator, 0.1 parts of sulfur as vulcanizer, 0.05 parts of benzothiazyl disulfide as accelerator, 0.1 parts of 2,2-methylene-bis 4-methyl-6t-butyl phenol as antioxidant, 0.2 parts of Stantone® 4005 Blue as Colorant, (available from the Harwick Chemical Corporation of Akron, Ohio); and 30 parts of calcium metasilicate as filler. The reaction mixture is stirred for 15 minutes. Thereafter, 30 parts of clay is added to the mixture, and the mixture is stirred for an additional 45 minutes.

A body layer mix composition is prepared by mixing 70 parts of Hycar® 1492P80 acrylonitrile-butadiene copolymer (available from the B. F. Goodrich Company of Cleveland, Ohio), 18 parts of Ameripol® 1012 styrene-butadiene copolymer (available from the Goodrich Chemical Company of Cleveland, Ohio), 12 parts of natural rubber, and 100 parts of toluene for 15 minutes. Thereafter, 400 parts of clay filler, 1.5 parts of tetramethylthiuram-disulfide as accelerator, 5.0 parts of zinc oxide as activator, 3.0 parts of sulfur as vulcanizer, 1.0 part of 2-mercaptobenzothiazole as accelerator, 1.0 part of Stantone® 4005 Blue Colorant, 0.2 parts of SRF black colorant, and 1.0 part of AgeRite Resin D (a polymerized 1,2-dihydro- 2,2,4-trimethylquinoline antioxidant which is available from the R. T. Vanderbilt Company of Norwalk, Conn.) are added to the reaction mixture, and the mixture is then stirred for 15 minutes. One hundred and twenty-five parts of the fibrillated fiber-staple fiber-particulate polymer blend are then added to the reaction mixture, and the reaction mixture is then stirred for 15 minutes. Then 60 parts of toluene is added to the reaction mixture, and the mixture is stirred for an additional 60 minutes.

A finish layer mix composition is prepared by mixing 8 parts of Hycar® 1092P80 acrylonitrile-butadiene copolymer and 2 parts of Ameripol® 1012 styrene-butadiene copolymer for 5 minutes. Fifty parts of toluene is added to the reaction mixture, and the reaction mixture is then stirred for 25 minutes. Then to this reaction mixture are added 0.5 parts of zinc oxide as activator, 0.2 parts of sulfur as vulcanizer, 0.1 part of AgeRite Resin D. as antioxidant, 20 parts of barium sulfate as filler, 0.14 part of Stantone 4006 Blue Colorant, and the mixture is stirred for 15 minutes. Thirty parts of clay as filler is added to the reaction mixture and the mixture is then stirred for an additional 45 minutes.

The gasket sheet is prepared on a sheeter, such as the Troester sheeter Model KD-IT30115, which is manufactured by the Troester Company of Hannover, Wulfel, West Germany. The roll temperature is set at from about 230–240 degrees F.; the speed on the meter gauge is set from about 30 to about 35 meters per minute; and the pressure gauge is set at 1013 kN (kilonewtons)×10. A sufficient amount of the starter composition of this example is added to the sheeter to completely cover the roll. Toluene and other volatiles are evaporated during processing. When the roll is coated, the pressure gauge is reset to above 5–6 kN×10, and the body composition of this example is then added to the sheeter; when the hot roll of the sheeter begins picking up the body composition coating, the speed on the meter gauge is reset to 20 meters per minute. After the thickness of the sheet on the sheeter reaches about 0.061 inch, the finish composition is coated onto the sheet until the total thickness of the sheet is about 0.063 inch. Thereafter, the sheet is removed from the sheeter. Of course, other sheet thicknesses such 1/32 inch and 1/8 inch may be used.

The gaskets may be analyzed by tensile strength tests in which an "average tensile strength" value may be determined by cutting sample strips of gasket material parallel to and perpendicular to the line of contact (of the rollers of the sheeter machine) upon the gasket sheet. That axis which is perpendicular to the line of contact is known as the "machine direction"; that axis which is parallel to the line of contact is herein designated as the "anti-machine" direction. The ratio of the tensile strength in machine direction to the tensile strength in anti-machine direction is typically about 3:1 for the gasket sheet. Typically, for example, for a ratio of 3:1 and average tensile of 2400 psi, the machine direction tensile is 3600 psi while the anti-machine direction is 1200 psi. The orientation of the fibers of the fiber/particulate blend during processing by the rollers causes some orientation of the fibers which results in greater strength along one axis while producing a lower strength along the other axis.

In general, the gasket compositions comprising elastomeric binders and the reinforcing amounts of fibrillated fiber/staple fiber/particulate polymer blends can be prepared readily by simply mixing the blend components into the resin system with conventional mixers, such as ribbon blenders, vertical or horizontal blenders, Koneaders, helical mixers, sigma mixers, Banbury mixers, two roll mills, single and twin screw extruder mixers and other known blenders. The compositions can be converted to sheets and cured also in conventional ways well known to those skilled in the art. Gaskets, and other molded articles and tires and the like can be formed from the sheets and from the mixed compositions also in well known ways in conventional equipment.

The elastomeric resin matrices will contain curatives and they can contain conventional additives in conventional amounts, such as pigments, dyes, heat stabilizers, antioxidants, plasticizers, lubricants, UV-stabilizers, flame retardant agents, processing aids, foaming agents, and the like in order to further improve the properties, including processability, of the gasket composition.

The illustrative examples which follow are intended to show how the fibrillated fiber/staple fiber/particulate polymer blend reinforced materials of the invention exhibit useful properties in gaskets and in rubber sealants.

DESCRIPTION OF THE PREFERRED EMBODIMENTS

The following examples are set forth for purposes of illustration only and are not intended limitations on the present invention except as set forth in the appended claims. All parts are by weight, unless otherwise indicated.

In the first series of examples is demonstrated the preparation of asbestos-free rubberized gasket-forming compositions of this invention.

| FORMULATION A | |
|---|---|
| Ingredients | Amounts by weight |
| Reinforcing Fiber - Particulate Polymer Blend(as specified) | 15% |
| Platy Talc filler | 70% |
| AN/BD/ST Latex Binder | 15% |
| | 100% |
| Sulfur | 2 phr |
| Zinc oxide | 4 phr |
| Butyl zimate | 1.5 phr |
| Agerite ® D antioxidant | 2 phr |
| Precipitation regulator | 2 phr |
| Precipitation Agent (Alum) | 5–10 phr | phr = parts per hundred of rubber
AN = acrylonitrile
BD = butadiene
ST = styrene

EXAMPLES 1–23

The basic procedure for forming the material into gaskets is as follows:,

1. Mix reinforcing blend, filler, cure agents and latex in deionized water using a Waring® Blender on low speed.

2. Precipitate the latex with alum while intermittently mixing in the blender.

3. Dilute the mixture to 1% solids, form into 12 in.×12 in. sheet in a papermaking sheet mold.

4. Precompact sheet in a press, partially dry in an oven, press cure 20 minutes at 250° F., and 600–900 psi., and finally post cure in an oven for 20 minutes at 250° F. In each instance, an excellent gasket is recovered.

FORMULATION B

A model polysulfide rubber foamed-in-place gasket system is prepared and cured using 1.5 parts per hundred rubber (phr) of the fibrillated fiber-fiber staple-particulate polymer blend.

The system composition is LP32 polysulfide resin with a curing agent consisting of 30 phr of 50% lead peroxide in dibutylphthalate.

EXAMPLES 24-47

The blend is mixed into the polysulfide resin with a lab spatula until uniformly dispersed. The mixture is degassed under vacuum for 30 minutes at room temperature. The curing agent is mixed in gently with a spatula to avoid air introduction. The mixed sealant composition is cured into a 2 mm thick rubber sheet by sandwiching the sealant between glass plates and curing the composition for 16 hours at 55 degrees C. In each case, excellent gasketing is produced.

FIBRILLATED FIBER / PULP DESCRIPTIONS

| Fibrillated Fiber Designation | Commercial Designation | CSF | Surface Area M²/g | Average Fiber Length, In. | Maximum Fiber Length, In. |
|---|---|---|---|---|---|
| A | CFF V110-1 | 250 | 50 | .25 | .30 |
| B | (110-1) | 180 | 50 | .25 | .30 |
| C | (110-1) | 430 | 50 | .28 | .32 |
| D | acrylic | 600 | 10 | .22 | .28 |
| E | aramid | 425 | 10 | .20 | .36 |
| F | polypropylene | — | | .28 | .31 |
| G | cellulose acetate | — | | .26 | .40 |

STAPLE DESCRIPTIONS

| Staple Designation | Chemical Description | Denier, g/9000 m | Diameter, Microns | Length (in.) | Modulus MSI | Crimp | Tenacity g/den |
|---|---|---|---|---|---|---|---|
| A | Acrylic | 1.1 | 13 | .25 | 0.75 | Yes | 3.0 |
| B | Acrylic | 0.8 | 10 | .25 | 0.5 | Yes | 2.5 |
| C | Acrylic | 0.8 | 10 | .50 | 0.5 | Yes | 2.5 |
| D | Acrylic | 5.4 | 23 | .25 | 0.8 | Yes | 3.0 |
| E | Acrylic | 3.0 | 18 | .25 | 0.5 | No | 2.5 |
| F | Acrylic | 16.0 | 40 | .25 | 0.5 | Yes | 2.0 |
| G | Acrylic | 5 | 22 | .25 | 0.5 | No | 2.5 |
| H | Acrylic | 1.5 | 13 | .25 | 2.0 | No | 5.0 |
| I | Pre-ox | 1.5 | 12.5 | .25 | 1.1 | No | 2.6 |
| J | Pre-ox | 1.5 | 12.5 | .125 | 1.3 | No | 2.6 |
| K | Aramid | 1.5 | 12 | .25 | 8 | No | 15–30 |
| L | Novoloid | 2 | 15 | .25 | 0.5 | No | 1.0 |
| M | Cellulose | N.A. | 30–40 | .16 | 0.8 | No | 5.0 |
| N | Cotton | N.A. | 25 | .10 | 0.8 | No | 5.0 |
| O | Acrylic | 0.8 | 10 | .04 | .5 | Yes | 2.5 |
| P | Acrylic | 1.1 | 13 | .02–.10 | .75 | Yes | 3.0 |
| Q | Acrylic | 5 | — | 0.2–.10 | .5 | No | 2.5 |

POWDER DESCRIPTIONS

| Powder Designation | Polymer Type | Average Particle Diameter, Micron | Surface Area, M²/g |
|---|---|---|---|
| A | acrylic | 50 | 8 |
| B | acrylic | 20 | 12 |
| C | acrylic | 30 | 9 |
| D | acrylic | 20 | 10-12 |
| E | polyetherimide | 50-100 | <2 |
| F | polyamideimide | 5 | <2 |
| G | acrylic | 15 | 10-12 |
| H | acrylic | 50 | 8 |

TABLE 1

| Example No. | Formulation | Fib. Fiber - % | Staple - % | Powder - % |
|---|---|---|---|---|
| 1 | A | A-60 | A-30 | A-10 |
| 2 | A | A-60 | A-10 | A-30 |
| 3 | A | A-60 | A-25 | A-15 |
| 4 | A | A-50 | A-20 | A-30 |
| 5 | A | A-40 | A-30 | A-30 |
| 6 | A | A-5 | A-70 | A-25 |
| 7 | A | A-10 | A-75 | A-15 |
| 8 | A | A-15 | A-60 | A-25 |
| 9 | A | A-20 | B-60 | A-20 |
| 10 | A | A-25 | C-55 | A-20 |
| 11 | A | A-30 | D-50 | A-20 |
| 12 | A | A-35 | E-45 | A-20 |
| 13 | A | A-40 | F-40 | A-20 |
| 14 | A | A-45 | G-35 | A-20 |
| 15 | A | A-45 | A-25 | B-30 |
| 16 | A | A-45 | A-25 | C-30 |
| 17 | A | A-35 | A-45 | B-20 |
| 18 | A | B-70 | A-25 | B-5 |
| 19 | A | C-70 | A-25 | B-5 |
| 20 | A | A-70 | A-25 | B-5 |
| 21 | A | A-40 | H-55 | B-5 |
| 22 | A | A-40 | I-50 | B-10 |
| 23 | A | A-35 | J-50 | B-15 |
| 24 | B | A-45 | J-40 | D-15 |
| 25 | B | B-35 | H-50 | D-15 |
| 26 | B | A-45 | A-35 | E-20 |
| 27 | B | A-35 | A-37 | F-28 |

TABLE 1-continued

| Example No. | Formulation | Fib. Fiber - % | Staple - % | Powder - % |
| --- | --- | --- | --- | --- |
| 28 | B | A-35 | H-33 | A-32 |
| 29 | B | A-35 | I-47 | B-18 |
| 30 | B | A-35 | J-50 | B-15 |
| 31 | B | E-35 | H-60 | H-5 |
| 32 | B | E-35 | K-60 | H-5 |
| 33 | B | A-5 | A-65 | B-30 |
| 34 | B | A-10 | I-60 | D-30 |
| 35 | B | A-35 | J-60 | D-5 |
| 36 | B | A-35 | I-60 | G-5 |
| 37 | B | A-35 | J-60 | G-5 |
| 38 | B | E-35 | A-55 | B-10 |
| 39 | B | E-35 | K-55 | B-10 |
| 40 | B | A-35 | K-55 | B-10 |
| 41 | B | G-35 | L-55 | B-10 |
| 42 | B | F-35 | M-55 | B-10 |
| 43 | B | A-35 | N-55 | B-10 |
| 44 | B | D-35 | A-55 | B-10 |
| 45 | B | A-40 | O-45 | H-15 |
| 46 | B | A-40 | P-45 | H-15 |
| 47 | B | A-40 | A-45 | H-15 |

EXAMPLE 48

If the general procedure of Example 1 is repeated, substituting for the latex rubber, a mixture comprising equal weights of acrylonitrile-butadiene copolymer rubber, styrene-butadiene copolymer rubber, and natural (polyisoprene) rubber, or a chloroprene rubber, excellent gaskets will be obtained.

EXAMPLE 49

The procedure of Example 4 is again followed except that the fibrillated fiber, the staple fiber and the powder are all produced from aramid polymer. Similar results are achieved.

EXAMPLE 50

The procedure of Example 4 is again followed except that the powder is produced from aramid powder. Similar results are obtained.

EXAMPLE 51

The procedure of Example 4 is again followed except that both the staple fiber and the powder are produced from aramid polymer. Again, the results are similar.

The above-mentioned patents, publications and test methods are incorporated herein by reference.

Many variations of the present invention will suggest themselves to those skilled in the art in light of the above detailed description. Instead of the rubbers exemplified, polyurethane rubber and/or ethylene-propylene rubber may be used. Instead of talc, mica, silica, calcium carbonate, carbon black, clay, paper filler clay, wollastonite, diatomaceous earth, mixtures thereof, and the like, can be used as fillers. Instead of a sulfur- or a lead peroxide-vulcanizable binder system, one can be used which cures with other peroxides, such as benzoyl peroxide. Instead of an aqueous dispersion of elastomeric binder, an organic solvent-based dispersion can be used. Instead of a beater addition process or a formed-in-place process, a two-roll gasket forming machine and process can be used. All such obvious modifications are within the full intended scope of the appended claims.

We claim:
1. An asbestos-free fiber reinforced material comprising:
(a) an elastomeric matrix composition; and
(b) an effective reinforcing amount of blend comprising:
1) from about 5 to about 75 weight percent of a fibrillated, synthetic, organic polymer fiber;
2) from about 20 to about 90 weight percent of a synthetic, organic polymer staple fiber; and
3) from about 5 to about 30 weight percent of synthetic, non-thermosetting organic polymer particles so to provide enhanced properties to gaskets, tires, timing belts, power transmission complings, shock absorbers, sealants and the like made therefrom.

2. A material as defined in claim 1 wherein matrix composition (a) comprises from about 70 to about 90 parts by weight and (b) comprises from about 30 to about 10 parts by weight per 100 parts by weight of (a) and (b) combined.

3. A material as defined in claim 1 wherein matrix composition (a) comprises:
(a)(i) a natural or synthetic rubbery elastomer;
(a)(ii) an inorganic particulate filler; and
(a)(iii) compounding agents.

4. An asbestos-free reinforced gasket produced from the material as defined in claim 1.

5. An asbestos-free composition adapted for use in gaskets, said composition comprising:
(a) an curable elastomeric resin and a curative therefore, alone, or in further combination with:
(i) a pigment,
(ii) a dye,
(iii) a heat stabilizer,
(iv) an antioxidant,
(v) a plasticizer,
(vi) a lubricant,
(vii) a UV-stabilizer,
(viii) a flame-retardant agent,
(ix) a processing aid,
(x) a foaming agent,
(xi) a filler,
(xii) non-acrylic organic fibers and pulps,
(xiii) inorganic fibers selected from glass, ceramic, mineral fibers, and the like, or
(xi) a mixture of any of the foregoing, and
(b) an effective concentration of a reinforcement for said composition, said reinforcement comprising:
1) from about 5 to about 75 weight percent of a fibrillated, synthetic, organic polymer fiber;
2) from about 20 to about 90 weight percent of a synthetic, organic polymer staple fiber; and
3) from about 5 to about 30 weight percent of synthetic, non-thermosetting organic polymer particle.

6. A composition as defined in claim 5, wherein said elastomeric resin comprises a natural or synthetic rubber or a rubber latex, and said curative comprises a cross-linker, a free radical-generator, or high energy radiation.

7. A composition as defined in claim 6, wherein said rubber comprises a mixture of acrylonitrile-butadiene copolymer rubber, styrene-butadiene copolymer rubber, and natural rubber, and said cross-linker comprises a vulcanizing amount of sulfur.

8. The gasket forming composition of claim 5 in which said at least one inorganic filler is selected from the group consisting of paper filler clay, wollastonite, talc, calcium carbonate, mica, and diatomaceous earth.

9. The gasket forming composition of claim 5 in which said at least one inorganic filler is employed in a total amount within the range of from bout 40 to about 70 parts by weight per 100 parts of the total fiber and filler weight.

10. A composition according to claims 1 or 5 wherein at least one of 1), 2), and 3) is an acrylic polymer.

11. A friction material according to claims 1 or 5 wherein each of 1), 2) and 3) is an acrylic polymer.

12. A friction material according to claim 10 wherein said acrylic polymer is an acrylonitrile polymer.

13. A friction material according to claim 11 wherein said acrylic polymer is an acrylonitrile polymer.

14. A composition material according to claims 1 or 5 wherein the average diameter of c) is below about 60 microns.

15. A composition material according to claims 1 or 5 wherein the CSF of 1) is below about 600 ml and the melting point of the polymer is above about 450° F.

16. A composition according to claims 1 or 5 wherein 3) has a BET surface area greater than 1 m²/g.

17. A composition material according to claims 1 or 5 wherein 2) has a length of from about 0.5 to 7 mm.

18. A composition according to claims 1 or 5 wherein either or both of 1) and/or 2) are crimped.

19. A composition according to claims 1 or 5 wherein either or both of 2) and/or 3) are pre-oxidized.

20. A composition material according to claims 1 or 5 wherein the concentration of 1) is from about 15 to about 50 weight percent, the concentration of 2) is from about 40 to about 80 weight percent and the concentration of 3) is from about 5 to about 15 weight percent.

21. A dry blend comprising:

a) from about 5 to about 75 weight percent of a fibrillated, acrylic or aramid polymer fiber;

b) from about 20 to about 90 weight percent of an acrylic or aramid polymer staple fiber and c) from about 5 to about 30 weight percent of soluble, acrylic or aramid polymer particles.

* * * * *